(12) United States Patent
Huang et al.

(10) Patent No.: US 10,480,974 B2
(45) Date of Patent: Nov. 19, 2019

(54) COMPOSITE MEMS FLOW SENSOR ON SILICON-ON-INSULATOR DEVICE AND METHOD OF MAKING THE SAME

(71) Applicants: Liji Huang, Santa Clara, CA (US); Chih-Chang Chen, Cupertino, CA (US)

(72) Inventors: Liji Huang, Santa Clara, CA (US); Chih-Chang Chen, Cupertino, CA (US)

(73) Assignee: SIARGO LTd., Santa Clara, CA (US)

( * ) Notice: Subject to any disclaimer, the term of this patent is extended or adjusted under 35 U.S.C. 154(b) by 38 days.

(21) Appl. No.: 16/017,917

(22) Filed: Jun. 25, 2018

(65) Prior Publication Data

US 2018/0299308 A1 Oct. 18, 2018

Related U.S. Application Data

(63) Continuation-in-part of application No. 14/875,534, filed on Oct. 5, 2015, now abandoned.

(51) Int. Cl.
| | |
|---|---|
| *G01F 1/692* | (2006.01) |
| *G01F 1/708* | (2006.01) |
| *G01F 7/00* | (2006.01) |
| *G01F 1/684* | (2006.01) |
| *G01F 1/696* | (2006.01) |

(52) U.S. Cl.
CPC ............ *G01F 1/692* (2013.01); *G01F 1/6845* (2013.01); *G01F 1/7084* (2013.01); *G01F 7/00* (2013.01); *G01F 1/696* (2013.01)

(58) Field of Classification Search
CPC ............................... G01F 1/7084; G01F 1/692
See application file for complete search history.

(56) References Cited

U.S. PATENT DOCUMENTS

| | | | | |
|---|---|---|---|---|
| 5,407,276 | A * | 4/1995 | Jones | G01K 7/343 361/282 |
| 6,234,016 | B1 * | 5/2001 | Bonne | G01F 1/6845 73/204.26 |
| 6,631,638 | B2 * | 10/2003 | James | G01F 1/6845 73/204.26 |
| 7,032,446 | B2 * | 4/2006 | Nakada | G01F 1/684 73/202.5 |
| 8,640,552 | B2 * | 2/2014 | Qasimi | G01F 1/6845 73/861.02 |
| 2011/0146398 | A1 * | 6/2011 | Beck | G01F 1/6845 73/204.27 |

(Continued)

*Primary Examiner* — Justin N Olamit

(57) ABSTRACT

The present invention disclosed a micromachined composite silicon flow sensor that is comprised of calorimetric flow sensing elements, time-of-flight sensing elements as well as independent temperature sensing element on a silicon-on-insulator device where the device layer is used for the thermal isolation membrane. The disclosed composite silicon flow sensor can measure mass flowrate, volumetric flowrate and flow medium temperature simultaneously, from which a full spectrum of flow parameters including flow pressure can be obtained. The sensor can be further used to alert any changes in physical properties of flow medium during operation. The disclosed manufacture process details the micromachining process of making such a sensor.

7 Claims, 6 Drawing Sheets

(56) References Cited

U.S. PATENT DOCUMENTS

Figure 1:
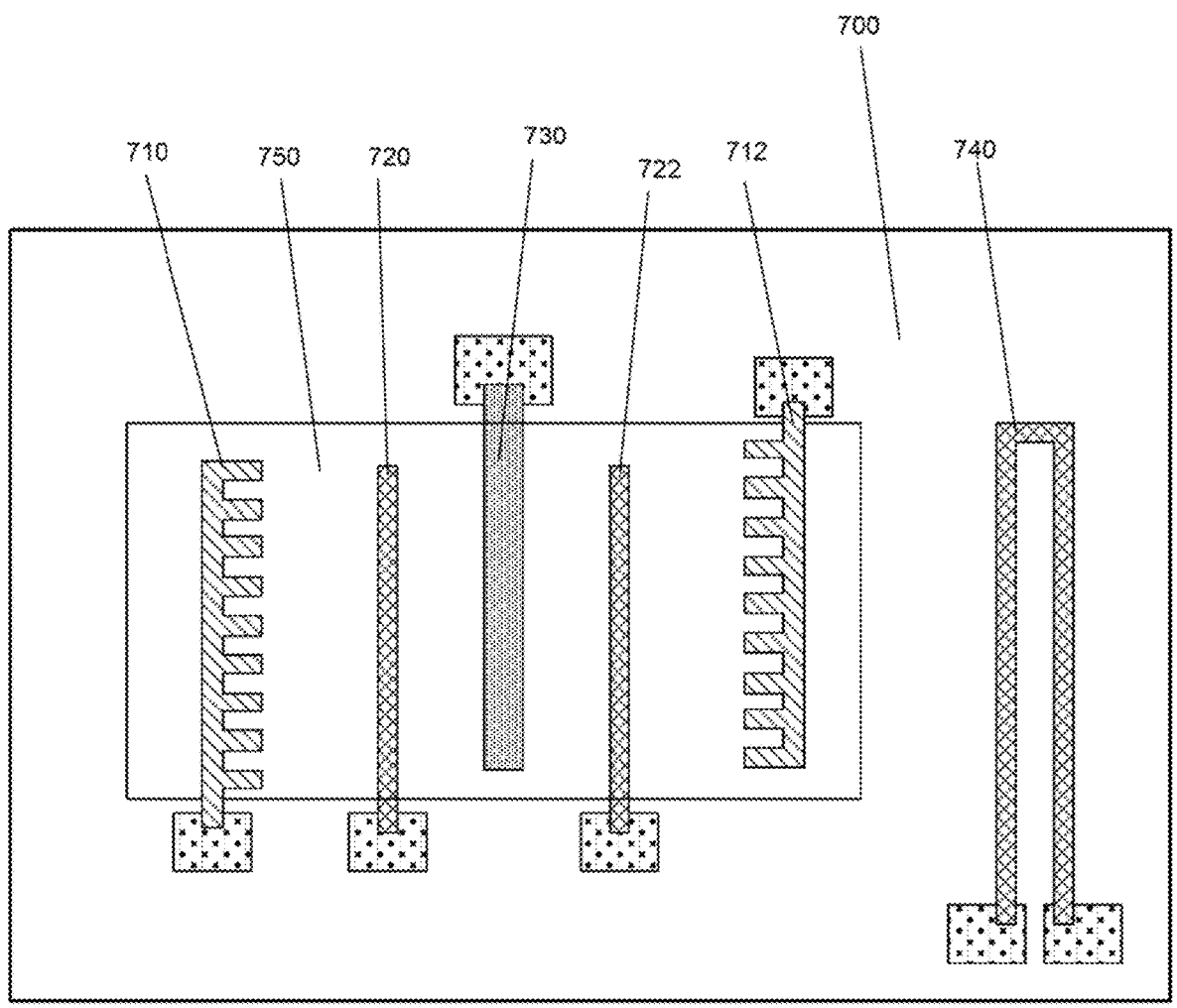

2014/0190252 A1* 7/2014 Huang .................. G01F 1/69
                                                  204/204.25
2014/0283595 A1* 9/2014 Huang .................. G01F 1/699
                                                  73/204.17

* cited by examiner

COMPOSITE MEMS FLOW SENSOR ON SILICON-ON-INSULATOR DEVICE AND METHOD OF MAKING THE SAME

BACKGROUND OF THE INVENTION

1. Field of the Invention

This invention relates to micromachined silicon flow sensors or Micro Electro Mechanical systems (MEMS) flow sensing technology that measures the volume as well as mass flow rate of a medium. The present invention also relates to microfluidic flow sensing in a limited space or channel size. This invention additionally provides the design and make of a micromachined composite flow rate sensor that measures both volumetric and mass flow of the medium. The present invention specifically relates design and process of making the same for a composite flow sensor for applications in medical precise drug delivery, precise fluid metering and control.

2. Description of the Related Art

Measurement of the fluidic flow rate in the micro flow domain is often a challenge, as the conventional mechanical metrology unit could not be applied. The typical metering approach is to use a syringe pump with the delivery scale and timer.

However, the flow profile driven by a syringe pump will have the character of a pulsed pattern that often leads to a non-constant flow rate resulting in large uncertainties for the metering. Use of a precise scale with a timer can achieve the desired result, however, due to the bulky size of the scale it is not practical in many applications in particular for the highly demanded portable metering. Therefore, a flow sensor with the functionality, digital data and miniature size will be the good candidate for the said applications.

The silicon flow sensors made with micromachining technology or MEMS (Micro Electro Mechanical Systems) technology have been well demonstrated for gas flow sensing where the sensing elements are placed on a membrane normally made of silicon nitride and the cavity underneath the membrane serves as the thermal isolation for the better signal to noise ratio as well as facilitating the fast response time. (Higashi, R. E.; Johnson, R. G. and Bohrer P. J., Flow sensor, U.S. Pat. No. 4,501,144, Feb. 26, 1985; Mayer, F. and Haeberli, A. M., Method and device for measuring the low of a fluid, U.S. Pat. No. 6,763,710; Jul. 20, 2004.) The sensor senses the medium flow rate mostly using the thermal calorimetric principle where a micro heater provides a constant temperature or constant power while the sensing elements located at up and down stream of the micro heater shall measure the temperature changes associated with mass flow rate of a flow medium. However, such a configuration is generally applicable for gas flow rate measurement but not for liquid flow rate applications because of fragile features in the structural design. In order to be functional in a high pressurized flow medium, the silicon nitride membrane usually has patterned through holes such that the gas can be channeled to the cavity underneath the membrane forming a pressure balance or maintaining the mechanical integrity of the membrane. For the liquid flow, however, the mobility of the liquid trapped inside the cavity shall have impact to the performance of the sensor as compared to that in the case for a gas medium. Because of the large thermal capacitance for liquid, the trapped liquid shall create instability to the micro heater. In addition, the geometry of the through holes in the membrane would also limit the capability for fast establishment of pressure balance for the membrane in the presence of the liquid where capillary could be dominated, and subsequently such sensors shall not be able to acquire the desired flow rate data for the liquid medium Schoenstein teaches a thin film flow sensor that can be used for liquid applications (Schonstein, T., Schell, R., Hepp, C., and Steitz, M., Apparatus and method for determining flow rate of a medium, WO Patent 2015/091145, Jun. 25, 2015). Such a sensor can be made on a ceramic substrate without the micro structure. It however could not achieve the same low flow rate sensitivity and the response time shall be much slower and the accuracy will also not be able to match to that with the cavity structure due to the required time for thermal equilibrium establishment in the presence of the bulk material. Further the dynamic range of the sensors made on a bulk materials is often cannot be extended as for the large uncertainties at the low flow sensing capability.

Alternatively, the micro-machined gas sensor can be applied for liquid flow sensing by placing the sensor outside the flow channel that is made of the special material with excellent thermal sensitivity (Mayer, F., Hornung, R. and Vanna, S., Flow sensor, U.S. Pat. No. 6,813,944, Nov. 9, 2004). In this approach, the sensor shall not be in direct contact with the liquid but be separated by the tube wall that effectively solve the issue for the sensor membrane deformation due to the applied force by the liquid fluid flow. Nonetheless, the package not only increases the cost of the device but limits the flow channel size and further reduces the dynamic range of the sensor, resulting in the huge limitations in applications. Use of a silicon wafer bonding technology, Further, the current micromachined silicon or thin film flow sensor products available on market are most made with the calorimetric sensing principle that is strongly dependent on the thermal properties of the detecting fluids. In many applications, use of a real fluid calibration is not feasible at the time of the sensor manufacture. In addition, in the actual applications, the fluid's thermal property may vary, i.e. the concentration of certain additives in the fluid may vary. In such cases, the measurement from the pre-calibrated sensor shall output large errors. This is particularly critical for the medical applications e.g., the precise drug delivery, where the drug concentration could be altered during the treatment.

In previous disclosures (Bonne, U., Kubisiak, D, Matthys, R. and Schuldt, S., Time lag approach for measuring fluid velocity, U.S. Pat. No. 6,234,016, May 22, 2001; Wu, X. and Huang, L., Configuration and methods for manufacturing time-of-flight MEMS mass flow sensor, U.S. Pat. No. 7,797,997, Sep. 21, 2010), time-of-flight technology is employed for a micromachined flow sensor. The sensors can be used to directly measure a fluid velocity regardless of the fluid concentration. It provides a precise measurement in the microfluidic domain, but for high speed flow, the sensor shall not be functional due to the restrictions of the dimension. In addition, in many of the current applications of the drug delivery, the fluid properties other than the fluid velocity shall also be crucial for assurance of the delivery being free of errors.

SUMMARY OF THE INVENTION

It is therefore desired to provide the design and manufacture process for a composite flow sensor that shall be able to measure the liquid flow with large dynamic range that can be packaged into various forms for desired applications.

This sensor should also be easily manufactured. The composite flow sensor shall have the capability to measure both the volumetric and mass flow rate with a fast response time such that some critical applications could be feasible. It shall be readily applicable in the microfluidic domain and provide a desirable precise metering of the liquid with low power consumption. The composite flow sensor shall further be robust against pressurized or pulsed flow medium. The composite flow sensor shall also be manufactured at a low cost such that it can be ready for high volume applications.

It is an object of the present invention to employ the calorimetric, anemometric and time-of-flight measurement principle such that the dynamic ranges of the measurable flow rate can be available as desired. The sensing elements are integrated on the same sensor chip while the control electronics shall access each of the elements simultaneously or sequentially according to the application requirements. The sensor shall have two micro heaters that are used for time-of-flight and anemometric sensing respectively. The time-of-flight and calorimetric sensing metering can share a microheater in which the pulsed thermal cycle is used for the time-of-flight sensing and the amplitude of the pulse is used for calorimetric sensing.

It is a further objective of the present invention that the time-of-flight sensing elements shall meter the volumetric flow rate of the desired fluid while calorimetric and/or anemometric sensing elements shall meter the mass flow rate of the desire fluid. The on-chip temperature sensor shall be utilized to compare the mass flow rate and volumetric flow rate with the calibration, which shall yield the pressure of the measured fluid. Further, if the measured pressure and temperature, the sensor can compare the consistency of the measured data from both time-of-flight and calorimetric or anemometric sensing element. Should a discrepancy is identified, the sensor shall alert for the variations of the fluid thermal values which are usually resulted from the changes in fluidic composition or concentration.

It is a further object of the present invention to utilize platinum or doped polysilicon as the sensing elements as well as the micro-beater material. The platinum is a stable metal material with excellent temperature coefficient for the desired sensitivity while the doped polysilicon can be made with the standard compatible metal-oxide-semiconductor process. Both of these materials ensure the stability of the sensor output and provide the desired reliability performance.

It is yet another object of the present invention to build the said composite flow sensor on a silicon-on-insulator (SOI) device. The SOI device can provide the silicon membrane that can have various thickness compared to those of a MEMS gas flow sensor with the silicon nitride membrane that shall not be over 1 micron meter in thickness because of the stress that was built into the materials during the formation of the silicon nitride. The thick membrane shall be able to survive and maintain the flatness against the applied pressure from the flow media. The silicon membrane also has the advantage of robustness against the corrosion induced from the possible elements in the fluids.

It is yet another object of the present invention to have the sensor passivated with silicon nitride thin film. The silicon nitride thin film has the desired thermal conductivity that shall not have impact to the sensitivity of the sensing elements right underneath of the passivation layer. The silicon nitride file is also having the desired hardness to against the attack from the fine particles that might exist inside the measured fluid. The passivation material is also robust against most of the common corrosive agent possibly existed inside the measured fluid.

It is yet another object of the present invention to build the sensor on a silicon-on-insulator device where the silicon layer serves as the membrane and the thickness of such shall be variable in accordance with the desired pressure rating for the application. To enhance the thermal performance, the sensing element shall be formed on a layer of silicon oxide which can be grown on the surface of the silicon layer or membrane in the range of a minor percentage of the thickness of the silicon layer such that the stress can be managed. The insulating layer can be used as the etch stop when forming the air cavity underneath the silicon layer or membrane. This structure shall further beneficial to the reduction of the response time as the thermal equilibrium shall be much more easier to be established compared to that in a bulk ceramic materials.

It is yet another object of the present invention to build the sensor on a silicon-on-insulator device such that the silicon via process (VIA) can be applied to the sensor. The VIA shall create the interface of the said sensor at the back of the sensor chip such that the wire bonding process can be eliminated in the sensor package which shall not only enhance the reliability but also reduce the chip size and lead to a significant reduction of the sensor foot print that in turn facilitates the cost sensitive applications.

It is an additional object of the present invention to design a micromachined composite flow sensor that can be easily fabricated in volume for the liquid flow metering applications with the accessible to microfluidic domain. The sensor is accessible to consumer applications wherein the cost structure requires a simple and low cost base. It is then desired to utilize the MEMS manufacturing process that is similar to the state-of-the art integrated circuitry manufacturing process. The process is having the character with a higher volume yields at a lower cost per sensor production. MEMS manufacturing process also benefits the uniformity of the sensor production on the same production batch which is important for the final assembly of the applications.

Other objects, features and advantages of the present invention will become apparent to those skilled in the art through the present disclosures detailed herein wherein like numerals refer to like elements.

BRIEF DESCRIPTIONS OF THE DRAWINGS

FIG. 1. The top view of the silicon micromachined composite sensor comprised of one micro-heater thermistor, two calorimetric sensing thermistors, two time-of-flight sensing thermistors and one ambient temperature sensing thermistor.

FIG. 2(*a*). Silicon-on-insulator with both side passivated with silicon nitride.

FIG. 2(*b*). Open device layer for VIA preparation and defined the membrane.

FIG. 2(*c*). VIA formation by forming the through hole for backside contact.

FIG. 2(*d*). Form through chip connection.

FIG. 2(*e*). Membrane slope formation for metallization preparation.

FIG. 2(*f*). Form sensing elements.

FIG. 2(*g*). Form inter-connection/metallization.

FIG. 2(*h*). Form surface passivation and protection.

FIG. 2(*i*). Form backside contact/sensor interface.

FIG. 2(*j*). Form cavity for thermal isolation.

Figure 3:
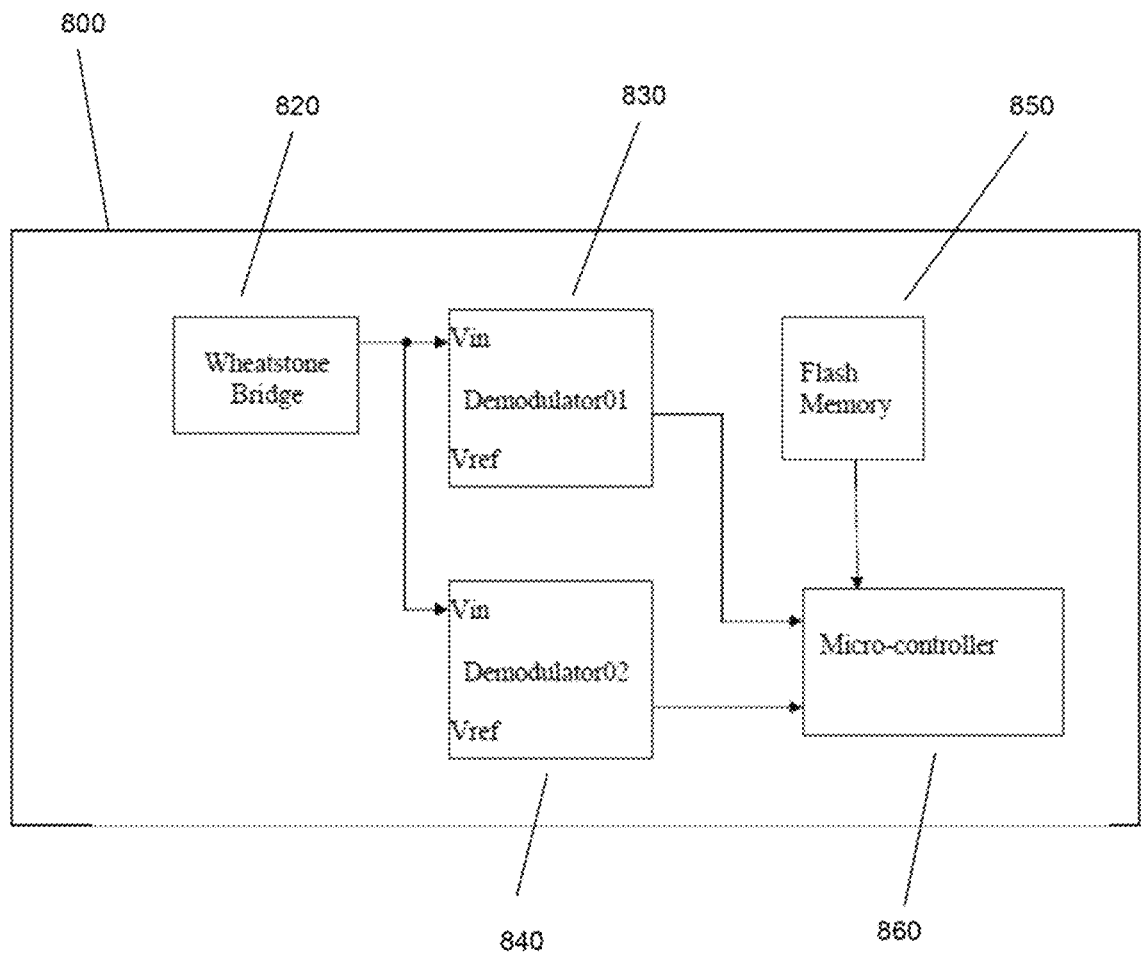

FIG. 3. Block diagram of the control electronics circuit.

DETAILED DESCRIPTION OF THE PREFERRED EMBODIMENTS

The preferred MEMS composite flow sensor (700) is comprised of one micro-heater thermistor (730), two calorimetric sensing thermistors (710 and 712), two time-of-flight sensing thermistors (720 and 722) and one ambient temperature sensing thermistor (740), as well as the membrane (750) as shown in FIG. 1.

The thermistors are connected to a control electronics circuit, which is including one microcontroller, two demodulators, and flash memory to control the micro-heater thermistor and collect sensing signals from the calorimetric and time-of-flight sensing thermistors, and wherein the two calorimetric sensing themistors along with two external resistors in the control electronics unit are combined to form a Wheatstone bridge. The MEMS silicon composite flow sensor utilizes the control electronics circuit and connect to the two calorimetric sensing thermistors (710 and 712) along with the micro-heater thermistor (730) to measure mass flow rate of flow medium by elevating the micro-heater thermistor to a constant temperature. The unbalanced temperature distribution due to the flow movement will render resistance difference between the two calorimetric sensing thermistors, and wherein the resistance difference will unbalance the Wheatstone bridge and generate a voltage output which can be utilized to calibrate as the mass flow rate measurement.

The MEMS silicon composite flow sensors utilizes the control electronics circuit and connect to the two time-of-flight sensing, thermistors (720 and 722) along with the micro-heater thermistor (730) to measure volume flow rate of flow medium by measuring phase shift of heat wave received on both of the time-of-flight sensing thermistors. The heat wave is a sinusoidal function wave generated by the micro-heater thermistor. The difference of the received phase shift signals of the heat wave on each of time-of-flight sensing thermistor is processed by the demodulators of the control electronics circuit, and which can be used to calibrate as volumetric flow rate measurement. The ambient temperature sensing thermistor (740) is used to measure the flow medium temperature, and thus the flow medium pressure can be calculated by equation (1) with the measured data of flow medium temperature, the mass flow rate (calorimetric), and the volumetric flow rate (time-of-flight).

The calorimetric sensor can be used to measure the mass flowrate of the medium, f(v,P,T) while the time-of-flight sensor can be used to measure the volumetric flowrate of the medium, f(v). The independent temperature sensor on the same chip shall acquire the temperature value of the flow medium. Therefore, if the flow medium is the same as that used in the calibration of the mass flow rate, f(v,P.T), the pressure value of the flow medium could also be calculated from the above measured value by $$P = \frac{T}{f(v)} \times f(v, P, T) \quad (1)$$

Where the P is the pressure value of the flow medium, and T is the temperature of the flow medium. Therefore the said composite sensor shall be able to acquire the desired full spectrum of information for a flow medium. Alternatively, when the flow medium has a known and constant pressure and temperature values of $P_0$ and $T_0$, the said composite sensor shall have the capability of alert the changes in flow medium properties by comparing the value of measured mass flowrate and calculated mass flowrate from volumetric flowrate and the known pressure and temperature.

In order to apply the preferred MEMS composite flow sensor for liquid flow measurement, it is imperative to have the sensor membrane being robust in maintaining its flatness because of changes in applied pressure such that the measured data shall not be deviated from those at calibration because of the changes in mechanical positions of the sensing elements. Therefore the membrane must have the necessary mechanical properties. Consequently the preferred MEMS composite sensor shall be built on a silicon-on-insulator device, where the device layer can be employed as the membrane that provides the necessary mechanical strength against the applied pressure during operation. The commonly used silicon nitride membrane could only have limited strength against deformation due to applied pressures from the flow medium, as the maximal silicon nitride thickness available in current process is about one micrometer due to membrane internal stress conditions. The strength of the device layer in a silicon-on-insulator device can be adjusted by modifying the thickness of the device layer during manufacture. The membrane center deformation, d, can be calculated according to literature (Liu, C., Chapter 6, *Piezoresistive sensors, in Foundations of MEMS*, PH Professional Business Publisher, 2012), $$d = \frac{apb^4}{Et^3} \quad (2)$$

Where $\alpha$ is constant value at a condition of an applied uniform pressure, p, to the membrane; b is the dimension of the membrane; t is the thickness of the membrane and the E is Young's module of the membrane's materials. Therefore for the application specified requirements of the accuracy that can be calculated from the deviation of the d/b, the thickness of the device layer can be identified for the preferred composite flow sensor.

The preferred MEMS composite flow sensor on a silicon-on-insulator substrate is made with the silicon micromachining process. The layer 110 of the silicon-on-insulator substrate is a thermally grown silicon dioxide layer, which is alleged as box layer. The layer 105, alleged as device layer, of the silicon-on-insulator is formed by silicon crystal silicon. And the layer 100 of the silicon-on-insulator, alleged as handle layer, is also formed by single crystal silicon. The suspending thermally isolated membrane structure is composed of the three layers of layer 110 (silicon dioxide), layer 105 (single crystal silicon), and layer 112 (silicon nitride) and wherein the suspending membrane is formed with a cavity underneath by bulk etching the silicon layer 100.

For a desired maximal pressure rating of the said composite flow sensor, the device layer thickness must be pre-determined by using equation (2). Once the silicon-on-insulator device is selected, the device is proceeded to have the surface passivation and masking layer preparation (FIG. 2(*a*)). The preferred silicon substrate of the device shall have high electrical conductivity either heavily doped with phosphorus or boron but preferred to be lightly doped with boron. The device layer of the said selected silicon-on-insulator device is preferred to be non-electrical conductive without any doping. The device is passivated using silicon nitride (111 and 112) at its both surfaces using low pressure chemical vapor deposition. The thickness of the silicon nitride should be from 100 to 300 nm but preferably 200 nm.

Figure 2A:
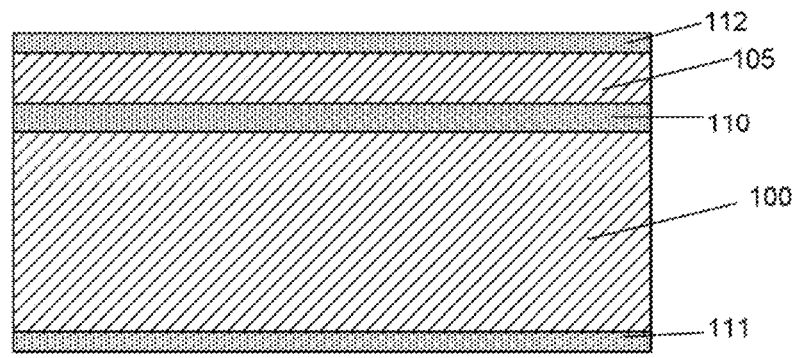
Figure 2B:
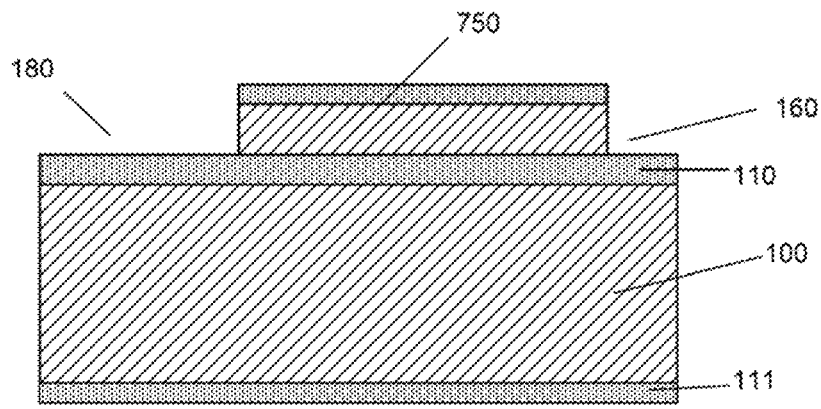

The MEMS composite flow sensor is preferably to have its interface or contacts made at the backside of the device such that the directly die-attachment package can be utilized for applications that may require miniature and fast throughput. As shown in FIG. 2(b), the surface passivated and masked device is then proceeded to define its membrane structure (750) while prepare the access points (180) for the through substrate conductive pathways. At the same time, the opening (160) provides the space for the independent temperature sensor where it shall be in close contact with the device substrate and away from the micro-heater on the membrane such that the temperature value shall be representing the flow medium temperature.

Figure 2C:
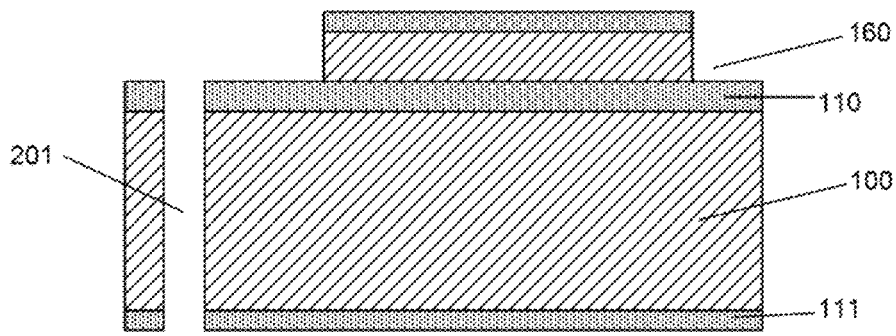

The preferred MEMS composite flow sensor is then proceed to open the through substrate conductive pathways (201) and the pre-designed locations (180). For several viable processes, the pathways could be through the silicon substrate as shown in FIG. 2(c). Or alternatively it can be made half way through while the remaining on through-hole portions could be later removed using chemical-mechanical planarization. The through-hole dimensions are preferably from 50 nm to 2000 nm but most favorably 1000 nm.

Figure 2D:
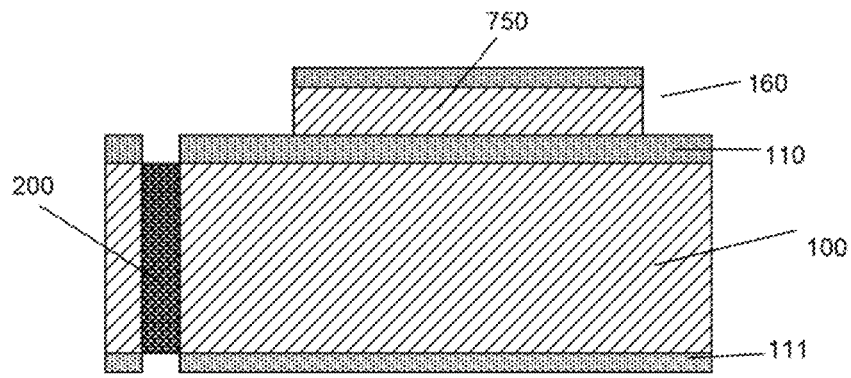

FIG. 2(d) shows the addition of the highly conductive materials (200) to the through conductive pathways (201) as the preferred silicon substrate (100) is non-conductive. The conductive materials can be metals such as nickel or permalloy or highly doped conductive polysilicon or conductive polymers such as polypyrenes or polycarbazoles.

Figure 2E:
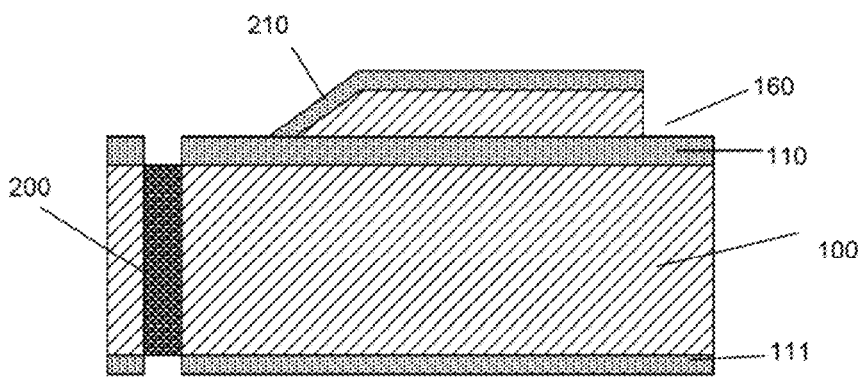

The composite flow sensor is then continued to the next manufacture step of the preparation of metallization or inter-connections for the sensing elements, as shown in FIG. 2(e). For most commonly applicable pressure rating below 1 MPa, the device layer thickness would be normally in a few micron meter range. Connections of the sensing elements at the edge of the membrane would be a challenge for the micro-machining process as the steep edge may easily create singularities which not only will lead to bad reliability but also may lead to direct failures. Therefore it is necessary to make the sharp edge of the membrane into a slope (210) with the step dry-etching process such that the stepped or smooth transition of the metallization lines or interconnection can be established.

Figure 2F:
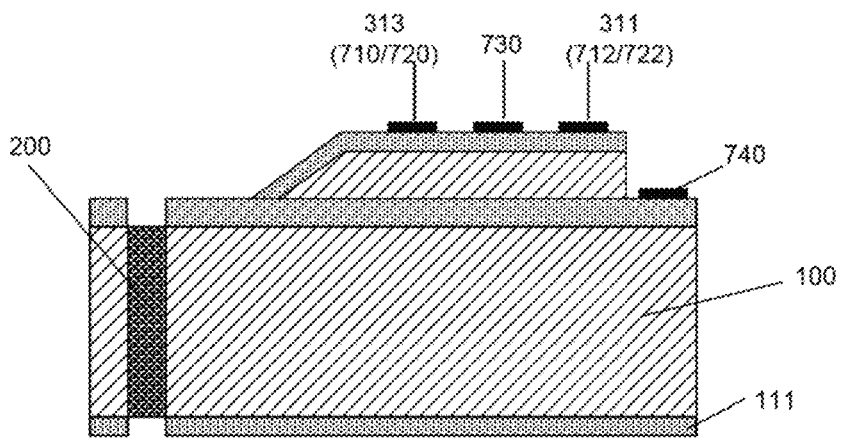

Referring to the contents described in FIG. 2(f), after the membrane structure including the inter-connection pathway is prepared, sensing elements 311 and 313 are deposited on the membrane. The sensing elements include the calorimetric and anemometric sensing elements (710 and 712) and the time-of-flight sensing elements (720 and 722). The micro-heater 730 is also deposited on the membrane sitting at the middle of the sensing elements 311 and 313, such that the said composite sensor can be used for measurement of bi-directional flow rate. A separate and independent temperature sensor 740 that measures the environmental temperature to provide the feedback for the micro-heater control such that the micro heater can maintain a constant power or constant temperature above the ambient which ensures a stable temperature field. This temperature sensor is placed on the substrate such that the environmental or flow medium temperature can be accurately measured. These sensing elements including the micro heaters can be collectively named as thermistors, and are preferably made of stable high temperature coefficient materials such as platinum, gold, nickel, permalloy, and doped conductive polysilicon through electronic beam evaporation or physical vapor deposition. In particular, the calorimetric or anemometric sensing thermistors can be made into a thermal pile configuration such that power consumption of the said composite sensor could be minimized. The thickness of each of the thermistors is preferably in the range of 80 nm to 200 nm but most preferably 100 nm for the optimization of materials stability and sensitivity of the said composite sensor performance.

Figure 2G:
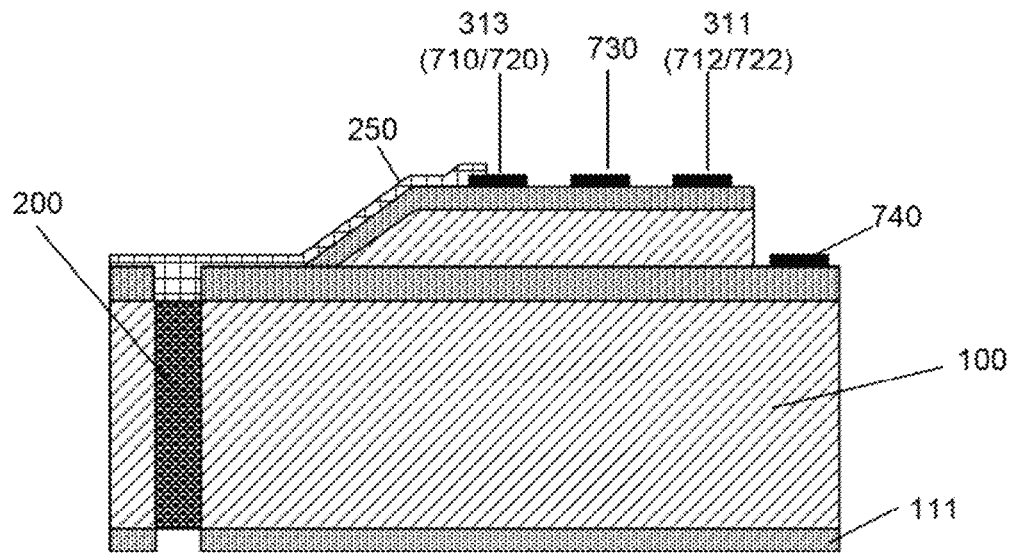

The interconnections 250 shown in FIG. 2(g) connect the sensing elements, micro-heater and the environmental thermistor to the through conductive pathways. Before the process of the interconnections, both sides of the through substrate conductive materials or front to back side connector shall be processed with the metallization to ensure that good connection can be established. The interconnection 250 is preferably made of gold or doped conductive polysilicon by electronic beam evaporation or physical vapor deposition. The thickness of the interconnection is preferably in the range of 100 nm to 300 nm but most preferably 200 nm for optimized materials stability and the said composite sensor performance.

Figure 2H:
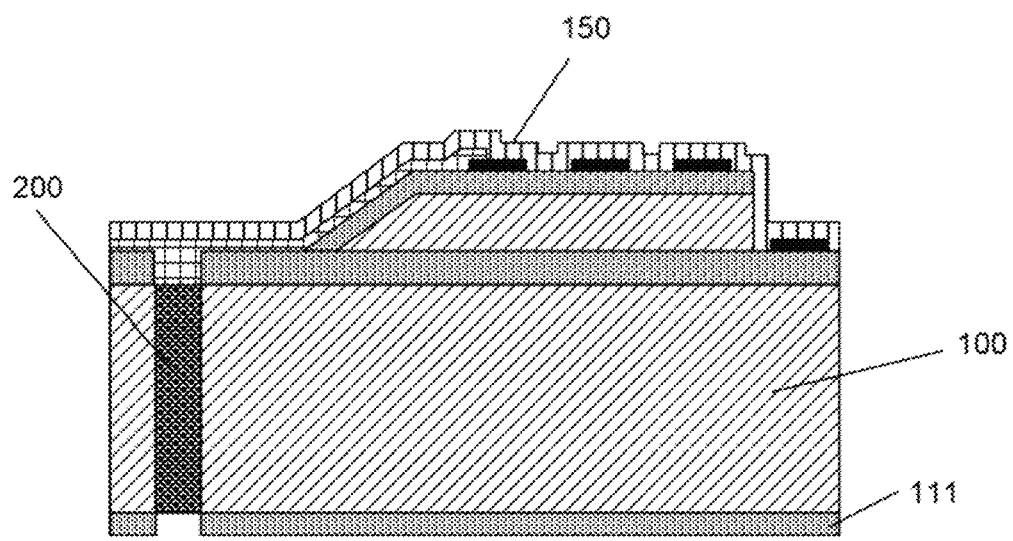

In order to prevent damages of the said composite flow sensor from the electrical short circuit between the sensing elements, micro-heater, environmental thermistor and among the interconnections, surface passivation is a must. As shown in FIG. 2(h), the surface passivation layer 150 shall conformably cover all areas on the front surface of the said composite flow sensor. The materials for the passivation layer are preferably having excellent thermal conductivity while maintaining mechanical strength. The preferably materials is silicon nitride or silicon carbide deposited using plasma enhanced chemical vapor deposition in a thickness range of 100 nm to 500 nm, but preferably 300 nm for the best surface coverage, mechanical strength and materials stability.

Figure 2I:
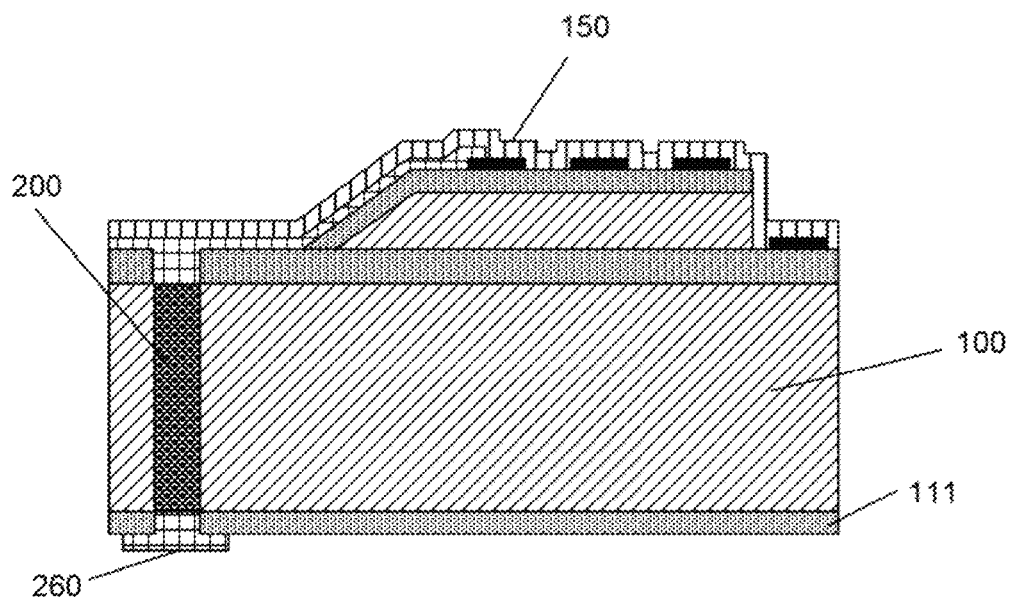
Figure 2J:
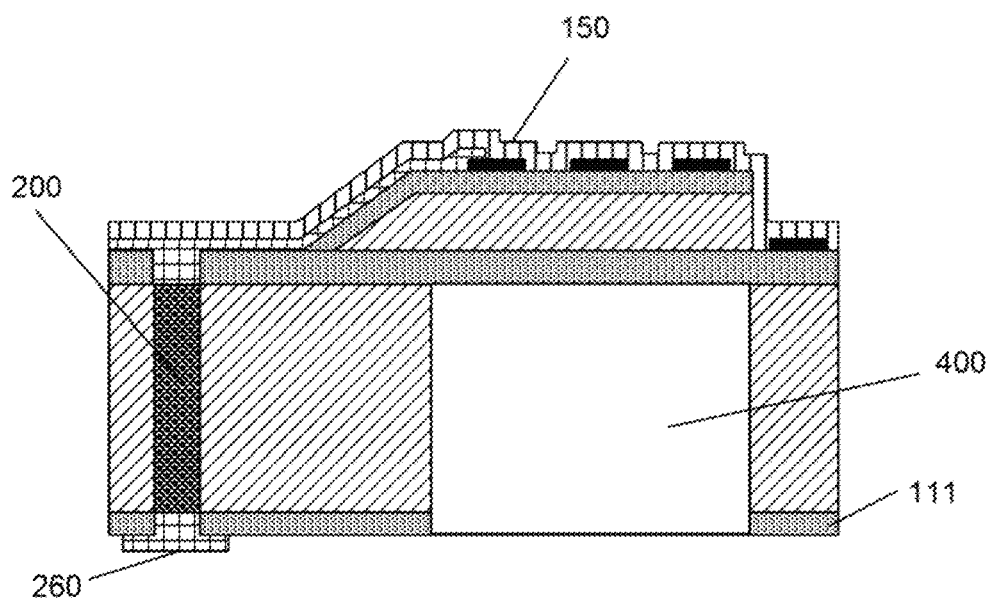

Making the thermal isolation cavity 400 as shown in FIG. 2(i) is the last step for manufacturing the composite flow sensor before the sensor wafer dicing. The cavity is made at right below the membrane 750 and the micro-beater 730 provides the thermal isolation from the flow medium. The structure ensures the sensitivity of the thermistors on the membrane. The cavity is preferably made with deep reactive ion etching of the bulk silicon or the wet chemical etching using chemical agents such as potassium hydroxide or tetramethylammonium hydroxide. The silicon oxide layer beneath the device layer or above the cavity can be removed with wet chemical etch or it may remain as part of the membrane structure. After the cavity is made, the said composite flow sensor micro-machining process is concluded and is ready for the die separation before processed for further package.

The control electronics circuit 800 is shown in FIG. 3. The two calorimetric sensing thermistors (720, 722) are connected to the control electronics circuit 800 which includes one microcontroller 860, two demodulators (830, 840) and flash memory 850 to control the micro-heater thermistor 730 and collect sensing signals from the calorimetric thermistors (720, 722). The two calorimetric sensing thermistors (720, 722) along with another two external resistors in the control electronics circuit are combined to form a Wheatstone bridge 820.

The MEMS silicon composite flow sensor utilizes the control electronics circuit 800 and the two calorimetric sensing thermistors (720, 722) along with the micro-heater thermistor 730 to measure a mass flow rate of flow medium by elevating the micro-heater thermistor 730 to a constant temperature. The unbalanced temperature distribution between the two calorimetric sensing thermistors (720, 722) due to the flow movement will render resistance difference between the two calorimetric sensing thermistors (720, 722), and whereas the resistance difference will unbalance the Wheatstone bridge and generate a voltage output which can be utilized to determine the mass flow rate.

The MEMS silicon composite flow sensors utilizes the control electronics circuit 800 and the two time-of-flight sensing thermistors (710, 712) alone with the micro-heater thermistor 730 to measure a volume flow rate of the flow medium by measuring the phase shift of a heat wave received on each of the time-of-flight sensing thermistors (710, 712), which the heat wave is a sinusoidal function wave generated by the micro-heater thermistor 730. The difference of the received phase shift signals of the heat wave on each of the time-of-flight sensing thermistors (710, 712) is processed by the demodulators (830, 840) of the control electronics circuit 800, and whereas the difference of the phase shift between the two time-of-flight thermistors (710, 712) can be used to determine the volumetric flow rate.

The invention claimed is:

1. A MEMS silicon composite flow sensor comprising:
   one silicon-on-insulator (SOI) substrate;
   one suspended thermally isolated membrane across over an underneath cavity formed by a backside silicon bulk etching; wherein the suspended thermally isolated membrane is composed of three layers from bottom to top with an order of silicon dioxide, silicon, and silicon nitride;
   one micro-heater thermistor which is disposed centrally on top of the suspending thermally isolated membrane and used as a heating source;
   two calorimetric sensing thermistors which are disposed on top of the suspended thermally isolated membrane and on upstream and downstream locations along a flow direction respective to the micro-heater thermistor;
   two time-of-flight sensing thermistors which are disposed on top of the suspended thermally isolated membrane and on upstream and downstream locations along the flow direction respectively to the micro-heater thermistor; and
   one ambient temperature sensing thermistor which is disposed on an area other than the suspended thermally isolated membrane of the silicon-on-insulator substrate;
   wherein the two calorimetric sensing thermistors and the two time-of-flight sensing thermistors are connected to a control electronics circuit, the control electronics circuit including one microcontroller, two demodulators, and flash memory to control the micro-heater thermistor and collect sensing signals from the calorimetric and time-of-flight sensing thermistors, and wherein the two calorimetric sensing thermistors along with two external resistors in the control electronics circuit are combined to form a Wheatstone bridge;
   wherein the MEMS silicon composite flow sensor utilizes the control electronics circuit and the two calorimetric sensing thermistors along with the micro-heater thermistor to measure a mass flow rate of flow medium by elevating the micro-heater thermistor to a constant temperature; wherein an unbalanced temperature distribution due to flow movement will render a resistance difference between the two calorimetric sensing thermistors; and wherein the resistance difference will unbalance the Wheatstone bridge and generate a voltage output which can be utilized to determine the mass flow rate;
   wherein the MEMS silicon composite flow sensors utilizes the control electronics circuit and the two time-of-flight sensing thermistors along with the micro-heater thermistor to measure a volume flow rate of the flow medium by measuring a phase shift of a heat wave received on each of the time-of-flight sensing thermistors; wherein the heat wave is a sinusoidal function wave generated by the micro-heater thermistor; and wherein a difference of the received phase shift signals of the heat wave on each of the time-of-flight sensing thermistors is processed by the demodulators of the control electronics circuit, and the difference can be used to determine the volumetric flow rate; and
   wherein the ambient temperature sensing thermistor is used to measure a flow medium temperature.

2. The MEMS silicon composite flow sensor of claim 1 wherein the thermistors are made with materials selected from platinum, permalloy, and doped polysilicon with desired conductivity.

3. The MEMS silicon composite flow sensor of claim 1 wherein metal contacts on a backside of the substrate are connected to thermistors on a front side of the substrate via through substrate conductive pathways; wherein the conductive pathways are formed by a deep reactive ion etching on the substrate to obtain through holes on the substrate and then filling the holes with conductive materials.

4. The MEMS silicon composite flow sensor of claim 1 wherein the underneath cavity is formed by etching through silicon until the silicon dioxide layer is reached inside the silicon-on-insulator wafer; wherein the silicon dioxide layer is used as an etching stop layer.

5. The MEMS silicon composite flow sensor of claim 1 wherein the silicon composite flow sensor has a surface passivated with dielectric films selected from silicon nitride or silicon carbide with a thickness range of 100 nm to 500 nm.

6. The MEMS silicon composite flow sensor of claim 1 wherein the composite flow sensor is attached to a carrier printed circuit board (PCB) by a direct soldering process with a die-attachment equipment; wherein the sensor is sealed with epoxy at an edge between the composite flow sensor chip and the carrier PCB such that no conductive materials penetrate a gap between the composite sensor flow chip and the carrier PCB.

7. The MEMS silicon composite flow sensor of claim 1 wherein the MEMS silicon composite flow sensor has backside contact packaging using die-attachment equipment without additional bonding wires.

\* \* \* \* \*